United States Patent
Telang et al.

(10) Patent No.: US 8,516,121 B1
(45) Date of Patent: Aug. 20, 2013

(54) METHOD AND APPARATUS FOR OPTIMIZING COMPUTER NETWORK USAGE TO PREVENT CONGESTION

(75) Inventors: Nilesh Girish Telang, Pune Maharashtra (IN); Kevin Elliott Jordan, Vadnais Heights, MN (US); Nitin Suresh Supekar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 230 days.

(21) Appl. No.: 12/164,787

(22) Filed: Jun. 30, 2008

(51) Int. Cl.
*G06F 15/173* (2006.01)

(52) U.S. Cl.
USPC ........... 709/226; 709/203; 709/212; 709/217; 709/230; 709/233; 709/235; 709/245; 709/248; 707/640; 711/161; 718/105

(58) Field of Classification Search
USPC ................. 709/203, 217, 226, 233, 235, 232, 709/230, 245, 248; 718/105; 707/640; 711/161
See application file for complete search history.

(56) References Cited

U.S. PATENT DOCUMENTS

| | | | | |
|---|---|---|---|---|
| 4,727,536 A * | 2/1988 | Reeves et al. | ................. | 370/468 |
| 5,828,837 A * | 10/1998 | Eikeland | ........................ | 709/202 |
| 5,991,292 A * | 11/1999 | Focsaneanu et al. | ......... | 370/352 |
| 6,405,256 B1 * | 6/2002 | Lin et al. | ........................ | 709/231 |
| 6,408,310 B1 * | 6/2002 | Hart | ..................... | 1/1 |
| 6,587,875 B1 * | 7/2003 | Ogus | ............................ | 709/223 |
| 7,047,309 B2 * | 5/2006 | Baumann et al. | ............. | 709/232 |
| 7,107,420 B2 * | 9/2006 | Boyd et al. | ..................... | 711/162 |
| 7,139,811 B2 * | 11/2006 | Lev Ran et al. | ............... | 709/217 |
| 7,171,482 B2 * | 1/2007 | Jones et al. | .................... | 709/231 |
| 7,321,960 B2 * | 1/2008 | Boyd et al. | ..................... | 711/162 |
| 7,330,893 B2 * | 2/2008 | Qiu et al. | ....................... | 709/226 |
| 7,363,375 B2 * | 4/2008 | Qiu et al. | ........................ | 709/226 |
| 7,526,624 B2 * | 4/2009 | Boyd et al. | ..................... | 711/162 |
| 7,539,745 B1 * | 5/2009 | Wang et al. | .................... | 709/224 |
| 7,616,585 B1 * | 11/2009 | Kritov et al. | .................. | 370/252 |
| 7,698,432 B2 * | 4/2010 | Short et al. | ..................... | 709/226 |
| 7,742,499 B1 * | 6/2010 | Erskine et al. | ................ | 370/468 |
| 7,743,161 B2 * | 6/2010 | Dey et al. | ....................... | 709/231 |
| 8,019,886 B2 * | 9/2011 | Harrang et al. | ............... | 709/232 |
| 8,126,847 B1 * | 2/2012 | Zheng et al. | ................... | 707/640 |
| 8,145,787 B1 * | 3/2012 | Rose et al. | ..................... | 709/235 |
| 8,296,410 B1 * | 10/2012 | Myhill et al. | ................. | 709/223 |
| 2002/0194340 A1 * | 12/2002 | Ebstyne et al. | ............... | 709/226 |
| 2003/0041165 A1 * | 2/2003 | Spencer et al. | ............... | 709/233 |
| 2003/0212787 A1 * | 11/2003 | Qiu et al. | ....................... | 709/224 |
| 2004/0221056 A1 * | 11/2004 | Kobayashi | .................... | 709/232 |
| 2005/0050287 A1 * | 3/2005 | Boyd et al. | ..................... | 711/162 |
| 2006/0020700 A1 * | 1/2006 | Qiu et al. | ....................... | 709/224 |
| 2006/0218203 A1 * | 9/2006 | Yamato et al. | ................. | 707/200 |
| 2007/0006024 A1 * | 1/2007 | Boyd et al. | ..................... | 714/10 |
| 2007/0025301 A1 * | 2/2007 | Petersson et al. | ............. | 370/338 |
| 2008/0065849 A1 * | 3/2008 | Boyd et al. | ..................... | 711/162 |
| 2008/0195745 A1 * | 8/2008 | Bowra et al. | .................. | 709/231 |
| 2008/0291827 A1 * | 11/2008 | Xiong et al. | ................. | 370/230.1 |
| 2009/0164530 A1 * | 6/2009 | Gilpin et al. | ................... | 707/204 |
| 2009/0282161 A1 * | 11/2009 | Mathur et al. | ................ | 709/232 |
| 2010/0049798 A1 * | 2/2010 | McCabe et al. | ............... | 709/203 |
| 2010/0149971 A1 * | 6/2010 | Noriega | ......................... | 370/230 |
| 2010/0173695 A1 * | 7/2010 | Hutcheson et al. | ............. | 463/23 |
| 2011/0116373 A1 * | 5/2011 | Lauer | ............................ | 370/232 |

* cited by examiner

*Primary Examiner* — Michael Won
(74) *Attorney, Agent, or Firm* — Campbell Stephenson LLP (57) ABSTRACT

A method and apparatus for optimizing computer network bandwidth usage to prevent congestion is described. In one embodiment, the method comprises comparing a permissible bandwidth usage with a data transfer rate to produce a comparison result and adjusting the data transfer rate for performing at least one data transfer operation based on the comparison result.

21 Claims, 6 Drawing Sheets

METHOD AND APPARATUS FOR OPTIMIZING COMPUTER NETWORK USAGE TO PREVENT CONGESTION

BACKGROUND OF THE INVENTION

1. Field of the Invention

Embodiments of the present invention generally relate to computer enterprise network management and, more particularly, to a method and apparatus for optimizing computer network bandwidth usage to prevent congestion where at least one data transfer operation is throttled based on a current network load.

2. Description of the Related Art

A computing environment for an enterprise provides various computer resources (e.g., storage, network, file system, backup, restore and/or the like) to one or more client computers. Furthermore, one or more data storage devices are employed to maintain various data (e.g., application data, financial data and/or the like) to be used by the one or more client computers. In some computing environments, the data is transmitted to the one or more data storage devices through a computer network infrastructure.

Typically, various processes for protecting the data used by the one or more client computers are performed by one or more configurations within the computing environment. For example, the data used by the one or more client computers is copied or backed up to the one or more data storage devices in order to prevent any loss in productivity caused by data corruption or any other disaster (e.g., natural disaster, power shortage and/or the like) within the computing environment. Once such a backup process is complete, critical data may be restored after such a disaster. As a result, the one or more client computers resume operations within the computing environment.

Conventional backup processes consume computer networking resources to store data on the one or more data storage devices. A backup process copies critical data that is stored locally in a volume at a client computer, such as a desktop computer. The backup process utilizes an amount of network bandwidth to transmit the critical data through a computer network for storage as a backup image (e.g., one or more files representing the volume) at another location (i.e., a remote location). For example, the critical data is written to a single shared file system (e.g., a volume on a disk) through one or more components of a Storage Area Network (SAN) architecture.

Network congestion is a problem caused when a number of running backup processes exceeds a capacity of the computer network. Naturally, as the number of processes being performed with the computer network increases, available bandwidth decreases. The backup process must share the network bandwidth with other processes including other backup processes being performed within the computing environment. Due to the importance of the backup processes for the operations of the computing environment, any network congestion poses a risk to the enterprise.

Therefore, there is a need in the art for a method and apparatus for optimizing computer network bandwidth usage to prevent network congestion where at least one backup process data transfer operation is throttled based on a current network load.

SUMMARY OF THE INVENTION

Embodiments of the present invention comprise a method and apparatus for optimizing computer network bandwidth usage to prevent congestion. In one embodiment, a method for regulating at least one data transfer operation based on a network load to optimize computer network bandwidth usage comprises comparing a permissible bandwidth usage with a data transfer rate to produce a comparison result and adjusting the data transfer rate for performing at least one data transfer operation based on the comparison result.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
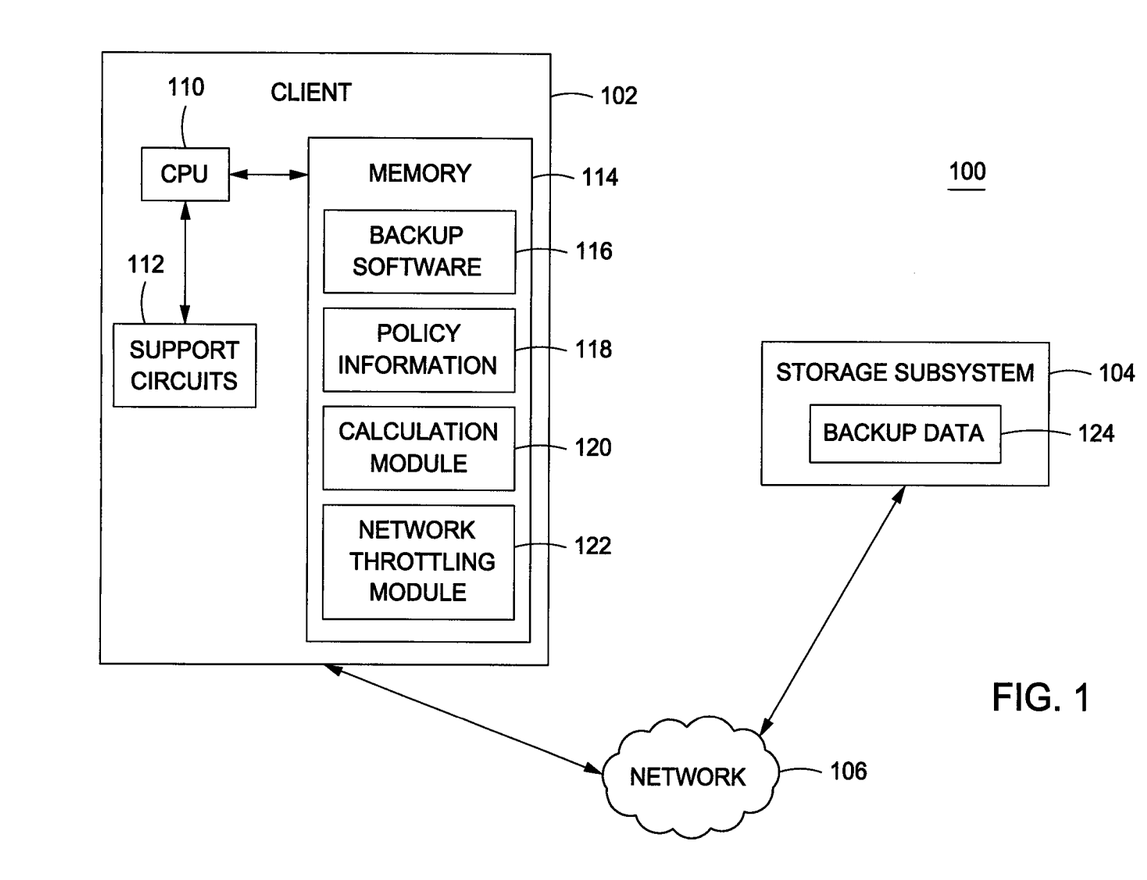
FIG. 1 is a block diagram of a system for optimizing computer network usage to prevent network congestion according to one or more embodiments of the present invention.

FIG. 1 is a system 100 for optimizing computer network usage to prevent network congestion according to one or more embodiments of the present invention. The system 100 includes a client 102 (i.e., a client computer) and a storage subsystem 104 in which each is coupled to each other through a network 106.

The client 102 is a computing device (e.g., a laptop, a desktop, a Personal Desk Assistant (PDA), a tablet, a mobile phone and the like) that comprises a central processing unit (CPU) 110, various support circuits 112 and a memory 114. The CPU 110 may comprise one or more commercially available microprocessors or microcontrollers that facilitate data processing and storage. Various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various data, such as policy information 118. The memory 114 includes various software packages, such as backup software 116, a calculation module 120 and a network throttling module 122.

The storage subsystem 104 generally includes various components (i.e., hardware and software) that are configured to manage storage resources within a computing environment. The storage subsystem 104 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for the client 102. The storage subsystem 104 facilitates permanent storage (i.e., backup) of critical computer data, such as backup data 124.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like. Furthermore, the network 106 may form a portion of a Storage Area Network (SAN) using various communications infrastructure such as Ethernet, Fibre Channel, InfiniBand, and the like.

According to one or more embodiments, the backup software 116 and the network throttling module 122 cooperate to optimize computer network bandwidth usage in order to prevent congestion where one or more backup process data transfer operations are regulated (i.e., throttled) based on a current network load and/or network connection (e.g., WIFI, Ethernet, dial-up and/or the like). The backup software 116 performs one or more backup processes at the client 102 and transfers one or more data blocks to the storage subsystem 104 for storage as the backup data 124. As the one or more backup processes are performed, the network throttling module 122 regulates the transfer of the one or more data blocks in order avoid any congestion within the network 106.

In operation, the network throttling module 122 controls a rate (i.e., speed) for performing one or more data transfer operations across the network 106 based on the policy information 118, a network connection and/or the current network load, which may defined by various statistics. For example, the current network load is defined as an amount of network resources that is presently available for use by the client 102, such as an available bandwidth. Normally, the client 102 utilizes various amounts of the available bandwidth for performing the one or more data transfer operations without taking the current network load or network connection into account. For example, the client 102 may consume a maximum amount of the available bandwidth, which may prevent another client computer from transferring data blocks to the storage subsystem and cause network congestion. The network throttling module 122 is configured to avoid such network congestion by maintaining a permissible amount of the available bandwidth for the client 102.

In one embodiment, the policy information 118 (e.g., a network throttling profile) specifies a portion (e.g., a percentage) of the available bandwidth that is permitted to be used for performing the one or more data transfer operations. Naturally, the available bandwidth fluctuates due to changes in the current network load. For example, the available bandwidth decreases as the current network load increases and vice versa. Hence, the rate for performing the data transfer operations increases or decreases based on the changes with the current network load. Consequently, the network throttling module 120 may prevent the client 102 and/or the backup software 118 from exceeding the specified percentage of the available bandwidth.

In another embodiment, the network throttling module 122 employs the calculation module 120 to compute the available bandwidth as well as a data transfer rate (i.e., a statistic indicating a current bandwidth usage). Generally, the data transfer rate refers to an amount (e.g., bytes per second) of the available bandwidth that is currently being used by the client 102 to perform one or more data operations. In one embodiment, the data transfer rate is computed from an amount of time that elapsed between consecutive data transfer operations, such as a previous data transfer operation and a current data transfer operation. For example, the data transfer rate may be computed from a timestamp taken during the current data transfer operation and a timestamp taken during the previous data transfer operation. In one embodiment, if the difference between the timestamps exceeds a pre-defined threshold (e.g., five minutes), the timestamp taken during the previous data transfer operation is disregarded since such a timestamp may skew the computation of the data transfer rate.

The available bandwidth is computed from an amount of time that is required to perform a number of data transfer operations (i.e., a total time required). For example, the available bandwidth usage may be computed from a round trip time metric (i.e., an amount of time to write one or more data blocks to a file share or read one or more data blocks from the file share). As another example, the available bandwidth usage may be computed from a difference in system times before and after a particular data transfer operation. In one embodiment, the available bandwidth is computed after a pre-defined validity period expires. In another embodiment, the available bandwidth is computed after a particular number of bytes are transferred from the client 102.

Based on the available bandwidth and the policy information 118, the calculation module 120 computes the permissible bandwidth usage according to various embodiments. In one embodiment, the permissible bandwidth usage is a statistic that indicates an amount of the available bandwidth that is permitted to be used for performing data transfer operations. As explained above, the policy information 118 indicates an acceptable portion (e.g., percentage) of the available bandwidth given a current network connection. The calculation module 120 may multiply the acceptable portion of the available bandwidth by a statistic, such as a recent calculation of the available bandwidth, to compute the permissible bandwidth usage.

Based on various statistics regarding the computer network, the calculation module 120 computes a data transfer rate according to one or more embodiments. In one embodiment, the data transfer rate is a statistic that indicates an amount of the available bandwidth that is actually being used by the backup software 116 to perform a backup job (i.e., transmit one or more data blocks to the backup data 124 in the storage subsystem 104 over the network 106). In one embodiment, the calculation module 120 divides a total data transmitted by a total time elapsed to compute the data transfer rate. Generally, the total data transmitted and the total time elapsed are statistics that indicate a number of bytes transmitted during a data transfer operation (e.g., of a backup job) and a number of seconds that elapsed between data transfer operations (e.g., consecutive data transfer operations). In one embodiment, the total data transmitted is a number of bytes written to a file share (e.g., WriteFile( )) or read from the file share (e.g., ReadFile( )). In one embodiment, the calculation module 120 computes the data transfer rate after every data transfer operation (e.g., every read/write operation).

The network throttling module 122 compares the permissible bandwidth usage to the data transfer rate to produce a comparison result according to various embodiments of the present invention. Based on the comparison result, a data transfer rate is determined for transmitting data during a backup job performed by the backup software 116. In another embodiment, the data transfer rate may be adjusted due to a current network load. Such an adjustment of the data transfer rate facilitates an optimization of the data transfer rate.

Moreover, based on the comparison result, the network throttling module 122 determines a "sleep" time period in which the performance of the backup job is paused and any data transfer operation is stopped in accordance with one embodiment. As a result, the data transfer rate decreases. In one embodiment, the data transfer rate also becomes closer to the permissible bandwidth usage and thus, more optimal by accounting for a current network load.

According to another embodiment, the network throttling module 122 determines that the data transfer rate is acceptable (i.e., substantially optimal) because the current data transfer rate does not substantially exceed the permissible bandwidth usage. Therefore, the data transfer rate remains unchanged because the data transfer rate is unlikely to cause congestion. In another embodiment, the network throttling module 122 increases a buffer size for subsequent data transfer operations, which causes an increase in the total data transmitted. As a result, the data transfer rate increases. In one embodiment, the data transfer rate also becomes closer to the permissible bandwidth usage and thus, more optimal by maximizing the current network load. In one embodiment, the buffer size may not be increases beyond a pre-defined upper limit. Alternatively, the network throttling module 122 may set the buffer size to a pre-defined number of bytes (e.g., 256 kb).

For example, the policy information 118 includes a network throttling profile that specifies fifty percent as an acceptable portion of the available bandwidth to use while avoiding network congestion. If an available bandwidth is calculated to be 10000 kb/s, then a permissible bandwidth usage is calculated to be 5000 kb/s. After a data transfer operation with a buffer size of 512 kb is performed, a timestamp (i.e., a first system time) taken before a current data transfer operation is subtracted from a timestamp (i.e., a second system time) taken after the current data transfer operation to compute a total time elapsed. For example, the total time elapsed may be 0.1 second. In one embodiment, the total time elapsed may exceed a pre-defined threshold (e.g., five minutes) in which any timestamp taken before the current data transfer operation is disregarded. In addition, a total data transmitted is a statistic that indicates a size of a buffer in the current data transfer operation.

For example, the total data transmitted for the data transfer operation may be 512 kb (i.e., the size of the buffer). Accordingly, 512 kb is divided by 0.1 second to compute a data transfer rate of 5120 kb/s. Based on the data transfer rate, a "sleep" time period may be determined in order to bring the data transfer rate closer to the permissible bandwidth usage and thus, more optimal. Because the data transfer rate of 5120 kb/s may not significantly exceed the permissible bandwidth usage of 5000 kb/s, a "sleep" time period of zero second (i.e., no "sleep time period) may be determined. On the other hand, if the data transfer rate significantly exceeds the permissible bandwidth usage, a "sleep" time period may be determined that decreases the data transfer rate.

Furthermore, as the current network load fluctuates, the available bandwidth changes accordingly. Hence, the permissible bandwidth usage also changes. Consequently, the data transfer rate may be adjusted to bring the data transfer rate to an optimal level or as close to the permissible bandwidth usage as possible. For example, if the permissible bandwidth usage decreases, a "sleep" time period may be implemented to reduce the data transfer rate. On the other hand, if the permissible bandwidth usage increases, a buffer size for a data transfer operation may be enlarged to increase the data transfer rate. The data transfer rate is continuously adjusted in an effort to optimize computer network usage.

Figure 2:
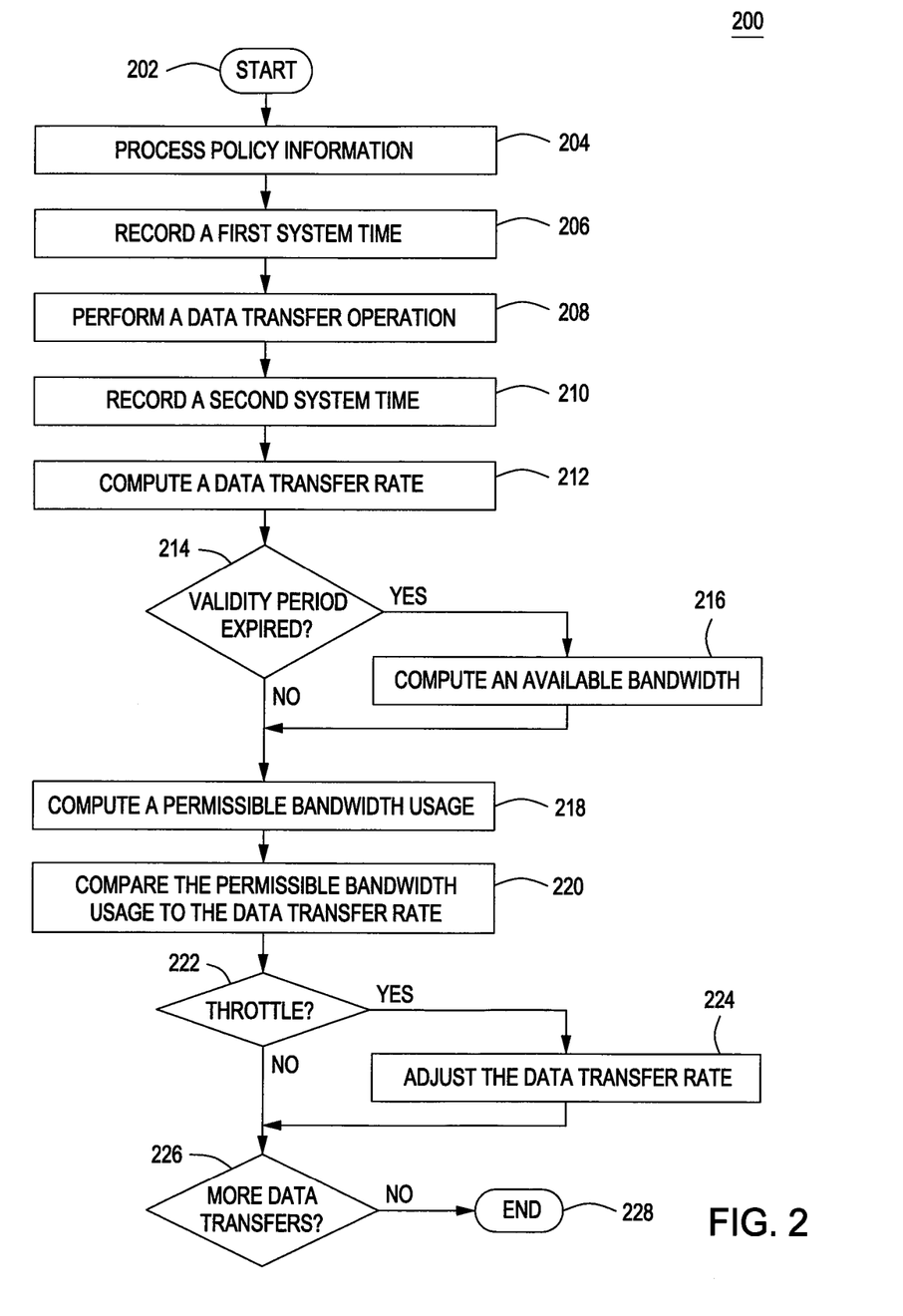
FIG. 2 is a flow diagram of a method for optimizing computer network usage to prevent network congestion according to one or more embodiments of the present invention.

FIG. 2 is a flow diagram of a method 200 for optimizing computer network usage to prevent network congestion according to one or more embodiments of the present invention. The method 200 begins at step 202 and proceeds to step 204.

At step 204, policy information is processed. At step 206, a first system time is recorded. At step 208, a data transfer operation is performed where a number of bytes are transmitted during a backup job. At step 210, a second system time is recorded. At step 212, a data transfer rate is computed. In one embodiment, the transmitted number of bytes is divided by the difference between the second system time and the first system time to compute the data transfer rate. As explained above, the data transfer rate represents an amount of network bandwidth that is current being used to perform one or more data transfer operations.

At step 214, a determination is made as to whether a validity period (e.g., thirty minutes) is expired. If the validity period expired, the method 200 proceeds to step 216. At step 216, an available bandwidth is computed. If the validity period did not expire, a previous computation of the available bandwidth is utilized for subsequent steps and the method 200 proceeds to step 218. At step 218, a permissible bandwidth usage is computed. At step 220, the permissible bandwidth usage is compared with the data transfer rate. At step 222, a determination is made as to whether is the computer network usage at the client 102 is to be throttled (i.e., regulated). If the computer network usage is to be throttled, the method 200 proceeds to step 224. At step 224, a data transmission rate is adjusted. If the computer network usage is not to be throttled, the method 200 proceeds to step 226. At step 226, a determination is made as to whether there are any more data transfers to be performed. If there are more data transfers to be performed, the method 200 returns to step 206. If there are no more data transfers to be performed, the method 200 proceeds to step 228. At step 228, the method 200 ends.

Figure 3:
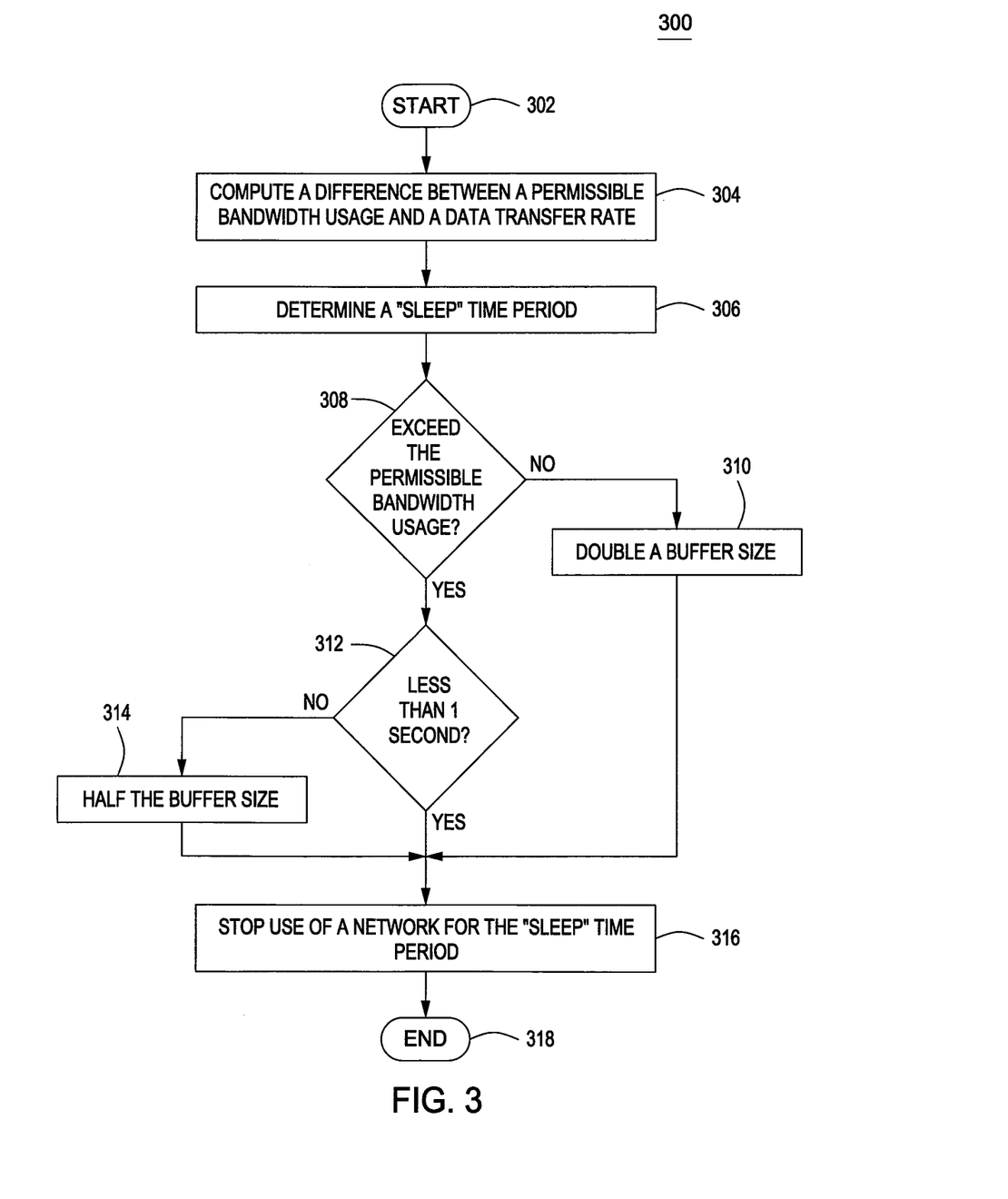
FIG. 3 is a flow diagram of method for regulating at least one data transfer operation based on a network load to optimize computer network bandwidth usage according to one or more embodiments of the present invention.

FIG. 3 is a flow diagram of method 300 for regulating at least one data transfer operation based on a network load to optimize computer network bandwidth usage according to one or more embodiments of the present invention. The method 300 begins at step 302 and proceeds to step 304.

At step 304, a difference between a permissible bandwidth usage and a data transfer rate is computed. At step 306, a "sleep" time period is determined (e.g., based on the computed difference). At step 308, a determination is made as to whether the permissible bandwidth usage exceeds the data transfer rate. If the permissible bandwidth usage does not exceed the data transfer rate, the method 300 proceeds to step 310. At step 310, a buffer size for a data transfer operation (e.g., a WRITE operation) is doubled. If the permissible bandwidth usage exceeds the data transfer rate by a pre-defined threshold, such as one second, the method 300 proceeds to step 312. In one or more embodiments, the pre-defined threshold may be configured to be any amount of time. At step 312, a determination is made as to whether the "sleep" time period is less than one second. If the "sleep" time period is not less than one second, the method 300 proceeds to step 314. At step 314, the buffer size is halved. In one embodiment, the buffer size may not be increased (e.g., doubled) or decreased (e.g., halved) beyond a pre-defined upper limit or lower limit, respectively. If the "sleep" time period is less than one second, the method 300 proceeds to step 316. At step 316, use of the computer network bandwidth at the client 102 is stopped for duration of the "sleep" time period. At step 318, the method 300 ends.

Figure 4A:
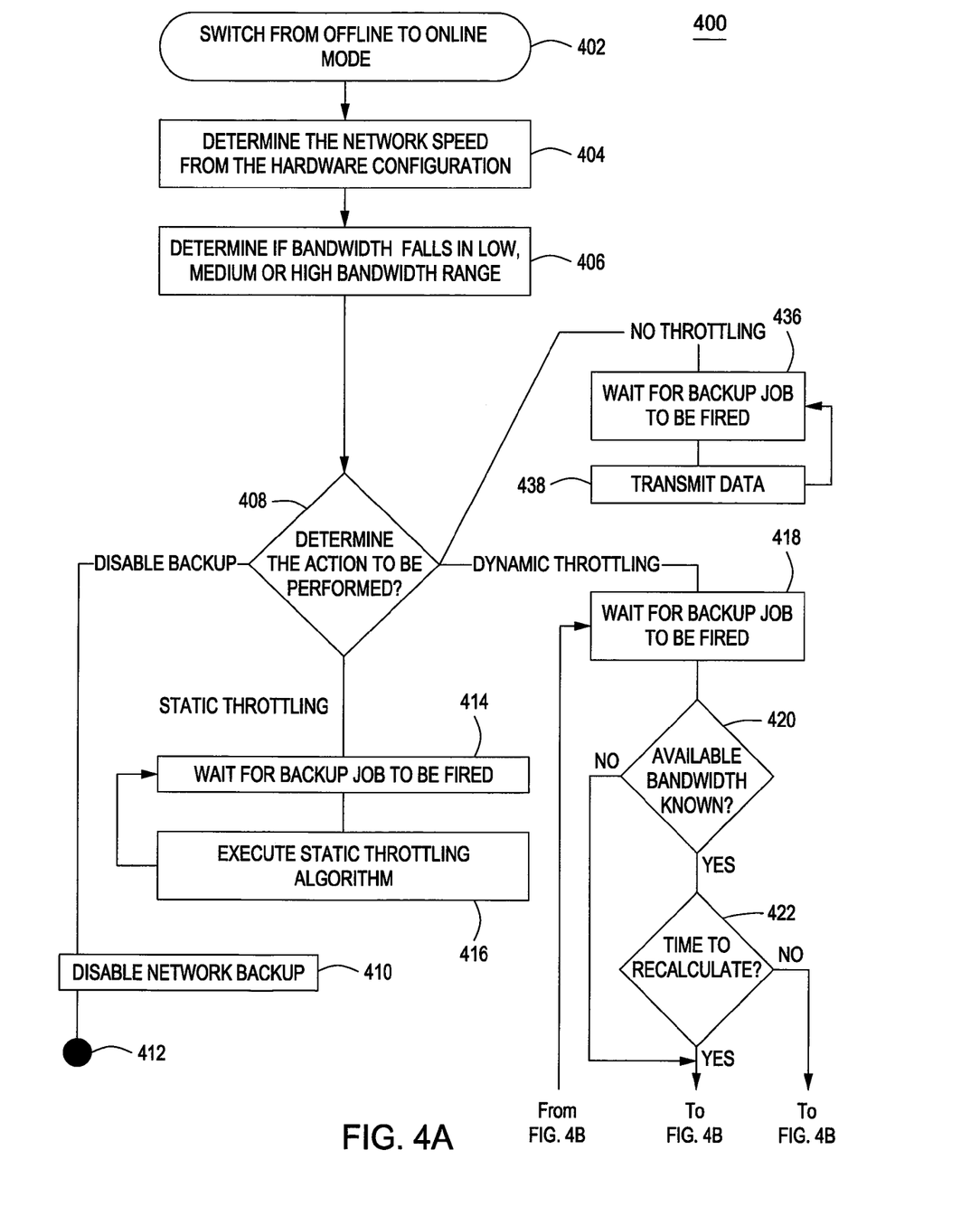
FIGS. 4A-B illustrate a flow diagram for a method for throttling a computer network using statistical sampling to perform backup jobs according to one or more embodiments of the present invention.
Figure 4B:
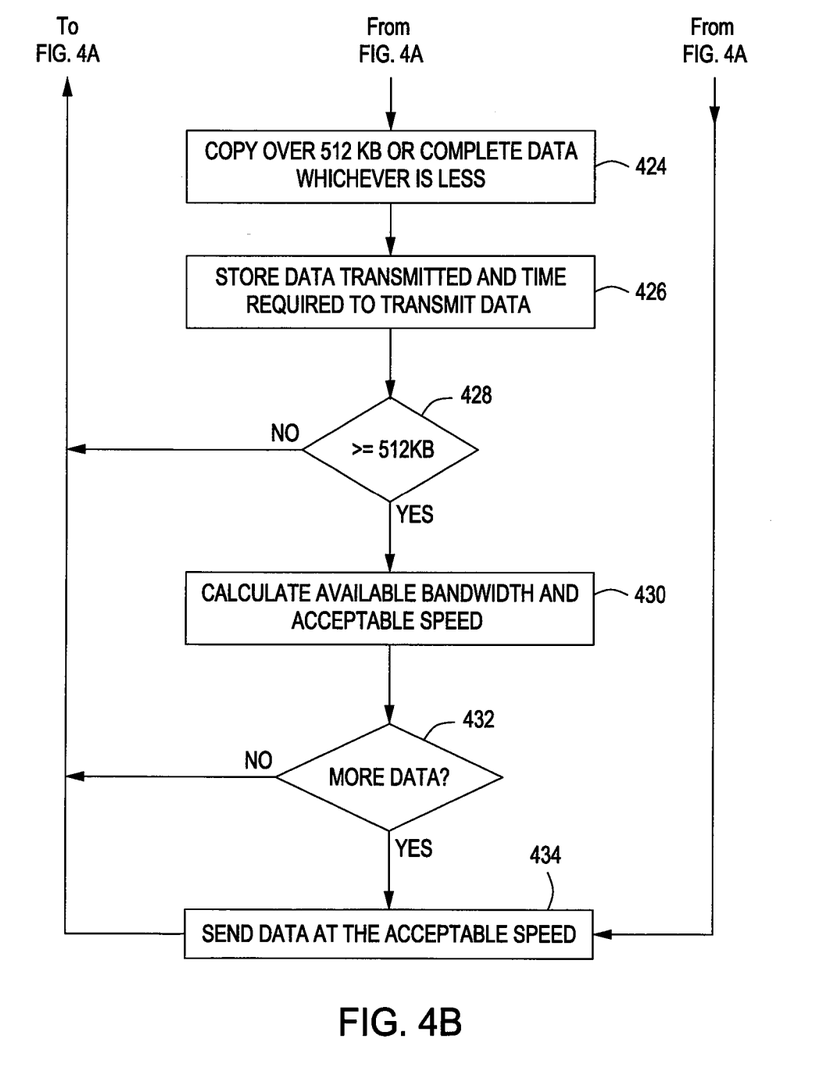

FIGS. 4A-B illustrate is a flow diagram of a method 400 for throttling a computer network using statistical sampling to perform backup jobs according to one or more embodiments of the present invention. The method 400 begins at step 402 where a client computer (e.g., the client 102 of FIG. 1) is switched from offline to online mode. At step 404, a network speed is determined from the hardware configuration. When a 'SpeedandDuplex' property of a network adapter is set to 'Auto', a speed is set to a value that is based on the speed of the computer network. Hence, the value obtained by querying the hardware configuration depends upon the speed of the computer network.

In one embodiment, the client computer is assigned at runtime to one of any number of bandwidth ranges (i.e., buckets or categories based on the speed of the network connection) based on the hardware configuration. For example, the client computer may use any one of three bandwidth ranges (e.g., a WiFi connection, an Ethernet connection or a dialup connection). It is appreciated that one or more embodiments of the present invention may be configured to accommodate more than three bandwidth ranges.

At step 406, whether the network bandwidth falls in low, medium or high bandwidth range is determined. In one embodiment, all active network adapters on the client computer are queried. Then, the speeds of the active network adapters are queried. If only one network adapted is active, the speed of the network card is used to determine the network bandwidth range (i.e., network connection). If there are multiple active network adapters, an adapter with a highest speed is selected to determine the network bandwidth range. Alternatively, a network adaptor with a lowest speed may also be selected.

At step 408, a determination is made as to what action is to be performed. If it is determined that all future backup processes are to be disabled, the method 400 proceeds to step 410. At step 410, network backup functionality is disabled. At step 412, the method 400 ends. If it is determined that the computer network usage is to be throttled statically, the method 400 proceeds to step 414. At step 414, the client computer waits for a backup job is to be fired. At step 416, a static throttling algorithm is executed. The method 400 repeats steps 414 to 416 for each subsequent backup job.

If it is determined that the computer network usage is to be throttled dynamically, the method 400 proceeds to step 418. At step 418, the client computer waits for a backup job to be fired. At step 420, a determination is made as to whether an available bandwidth is known. If the available bandwidth is known, the method 400 proceeds to step 422. At step 422, a determination is made as to whether the available bandwidth is to be recalculated. If the available bandwidth is not to be recalculated, the method 400 proceeds to step 434 at which data (e.g., a data block) is transmitted at the acceptable speed (i.e., an acceptable data transfer rate). In one embodiment, the data transfer rate may be a portion of the available bandwidth as described above.

If the available bandwidth is to be recalculated, the method 400 proceeds to step 424. Steps 424 to steps 434 are illustrated in FIG. 4B. If the available bandwidth is not known, the method 400 proceeds to step 424. At step 424, data (e.g., five hundred and twelve or more kilobytes) is transmitted (e.g., copied) to a backup image. At step 426, a size of the transmitted data and a time required for the transmission are determined and stored at the client computer.

At step 428, a determination is made as to whether the size of the transmitted data is greater than or equal to five hundred and twelve kilobytes. If the size of the transmitted data is greater than or equal to five hundred and twelve kilobytes, the method 400 proceeds to step 430. If the size of the transmitted data is less than five hundred and twelve kilobytes, the method 400 returns to step 418 at which the client computer waits for a next backup job. At step 430, the available bandwidth is (re)calculated. Furthermore, an acceptable speed (i.e., an optimal data transfer rate) is calculated.

In one embodiment, a policy specifies a portion of the available bandwidth that is permitted to be used for transmitting the data. Accordingly, such a policy is configured to throttle computer network usage by the client computer. At step 432, a determination is made as to whether more data is to be transmitted. If more data is to be transmitted, the method 400 proceeds to step 434. If more data is not to be transmitted, the method 400 returns to step 418 at which the client computer (e.g., a network throttling module) waits for a next backup job to be fired. At step 434, data is transmitted at the acceptable speed (i.e., optimal data transfer rate).

Figure 5:
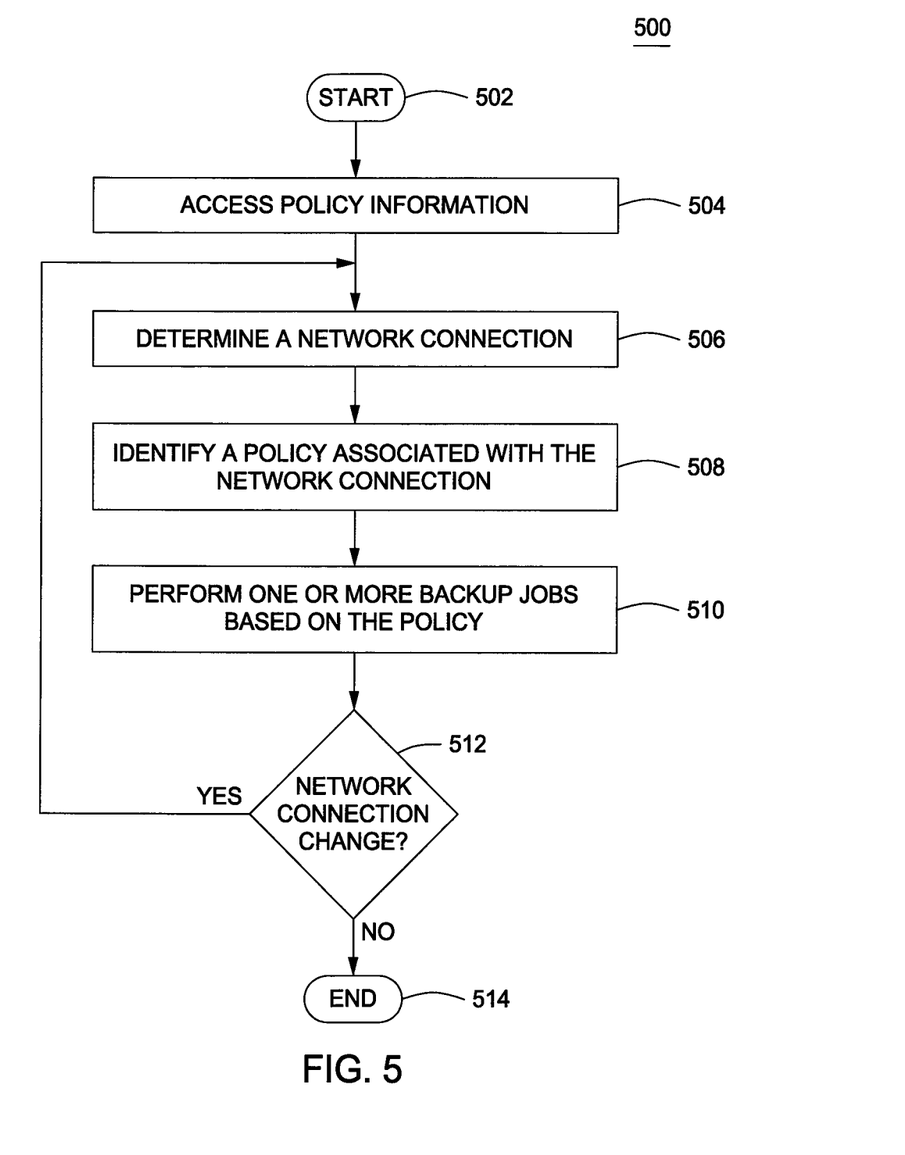
FIG. 5 is a flow diagram of a method for processing a network throttling profile according to one or more embodiments of the present invention.

FIG. 5 is a flow diagram of a method for processing policy information according to one or more embodiments of the present invention. The method 500 starts at step 502 and proceeds to step 504. At step 504, policy information (e.g., the policy information 118 of FIG. 1) is accessed. At step 506, a network connection is determined. At step 508, a network throttling profile associated with the determined network connection is identified. For example, if the network connection (e.g., a wireless WiFi connection) has a medium available bandwidth (e.g., a range between 100 kilobytes/sec (kb/s) to 100000 kb/s), the associated network throttling profile may indicate a first portion (e.g., twenty percent) that is permitted to be used to transfer data. If the network connection (e.g., a wired, Ethernet connection) has a high available bandwidth (e.g., 100000 kb/s or more), the associated network throttling profile may indicate a second portion (e.g., ten percent) that is permitted to be used to transfer data. If the network connection (e.g., a dialup connection) has a low available bandwidth (e.g., 100 kb/s or less), the associated network throttling profile may indicate that all future data transfer operations are disabled because the network connection is too slow to efficiently perform one or more subsequent backup jobs.

At step 510, one or more backup jobs are performed based on the identified network throttling profile. At step 512, a determination is made as to whether the network connection changed. For example, it is determined if the network connection changed from a wireless, WiFi connection to a dial-up connection. If the network connection changed, the method returns to step 506. A network throttling profile associated with the current network connection is identified and used to dictate the performance of any subsequent backup job. At step 512, the method 500 proceeds to step 514. At step 514, the method 500 ends.

While the foregoing is directed to embodiments of the present invention, other and further embodiments of the invention may be devised without departing from the basic scope thereof, and the scope thereof is determined by the claims that follow.

The invention claimed is:
1. A method comprising:
  performing a network backup operation, wherein
    the network backup operation is performed at a data transfer rate, and the performing the network backup operation comprises
      identifying a bandwidth range of a network connection,
      selecting a network throttling profile from a plurality of network throttling profiles, wherein the network throttling profile is selected based, at least in part, on the bandwidth range of the network connection,
the network throttling profile is based on information regarding the network backup operation,
the network connection is one of a plurality of network connections, and
each of the plurality of network throttling profiles is associated with at least one of the plurality of network connections,
computing a permissible bandwidth usage for the network connection using the network throttling profile, wherein
the permissible bandwidth usage comprises
a portion of available bandwidth of the network connection,
the permissible bandwidth usage is allocated for performing one or more data transfer operations, and
the network throttling profile identifies the portion,
producing a comparison result by comparing the permissible bandwidth usage and the data transfer rate, wherein
the data transfer rate is used in performing at least one data transfer operation, and
the network backup operation comprises the at least one data transfer operation,
adjusting the data transfer rate based on the comparison result, wherein
the adjusting brings the data transfer rate closer to the permissible bandwidth usage, and
performing the at least one data transfer operation, wherein
the at least one data transfer operation is performed at the data transfer rate.

2. The method of claim 1, wherein the comparison result is a difference between the permissible bandwidth usage and the data transfer rate.

3. The method of claim 1, wherein the adjusting the data transfer rate further comprises determining a time period for which the performance of the at least one data transfer is paused.

4. The method of claim 3, wherein the adjusting the data transfer rate further comprises stopping the at least one data transfer operation for a duration of the time period in order to reduce the data transfer rate.

5. The method of claim 1 further comprising computing the available bandwidth from a total data transmitted statistic and a total time required statistic.

6. The method of claim 5, wherein the computing the available bandwidth is performed after a validity period expires.

7. The method of claim 1, wherein the computing the permissible bandwidth usage using the network throttling profile further comprises multiplying the portion with the available bandwidth to compute the permissible bandwidth usage, wherein the portion is a percentage.

8. The method of claim 1 further comprising computing the data transfer rate from a total data transmitted statistic and a total time elapsed statistic.

9. The method of claim 1, wherein the identifying the network throttling profile further comprises
determining a network bandwidth of the network connection, wherein
the network bandwidth is based on a configured speed of the network connection;
determining a network bandwidth range within which the network bandwidth falls, wherein
the network bandwidth range is one of a plurality of network bandwidth ranges, and
each of the plurality of network bandwidth ranges is associated with at least one of the plurality of network throttling profiles; and
identifying the network throttling profile that is associated with the network bandwidth range.

10. The method of claim 1, wherein the adjusting the data transfer rate further comprises adjusting a buffer size associated with the performing the at least one data transfer operation.

11. The method of claim 1, further comprising:
producing a plurality of data blocks by performing one or more backup operations using a computer, wherein
the one or more backup operations comprise the backup operation,
the plurality of data blocks comprises
a set of backup data, and
the set of backup data represents a backup of a data volume; and
performing the one or more data transfer operations, wherein
the performing the one or more data transfer operations comprises
transferring one or more of the plurality of data blocks to the storage subsystem,
the one or more of the plurality of data blocks is transferred via a network connection coupling the computer and the storage subsystem,
the set of backup data is stored at the storage subsystem, and
the transferring occurs at the data transfer rate.

12. The method of claim 1, wherein
each of the plurality of network throttling profiles indicates a respective portion, and
each respective portion of the plurality of network throttling profiles is distinct.

13. The method of claim 1, wherein
the network throttling profile indicates that a future data transfer operation is disabled.

14. An apparatus comprising:
a memory;
a backup module, wherein
the backup module is configured to perform a network backup operation at a data transfer rate, and
the network backup operation comprises one or more data transfer operations; and
a network throttling module, wherein
the network throttling module is configured to control the data transfer rate of the backup operation by virtue of being configured to
identify a bandwidth range of a network connection,
select a network throttling profile from a plurality of network throttling profiles, wherein
the network throttling profile is selected based, at least in part, on the bandwidth range of the network connection,
the network throttling profile is based on information regarding the network backup operation,
the network connection is one of a plurality of network connections, and
each of the plurality of network throttling profiles is associated with at least one of the plurality of network connections, compute a permissible bandwidth usage for the network connection using the network throttling profile, wherein
the permissible bandwidth usage comprises
a portion of available bandwidth at the network connection,
the permissible bandwidth usage is allocated for performance of the one or more data transfer operations, and
the network throttling profile identifies the portion,
compare the permissible bandwidth usage and the data transfer rate to produce a comparison result, wherein
the data transfer rate is used to perform at least one of the one or more data transfer operations, and
the network backup operation comprises the at least one of the one or more data transfer operations, and
adjust the data transfer rate based on the comparison result, wherein
the data transfer rate is adjusted closer to the permissible bandwidth usage.

15. The apparatus of claim 14 further comprising
a calculation module configured to compute the available bandwidth from a total data transmitted statistic and a total time required statistic.

16. The apparatus of claim 15, wherein
the calculation module is configured to multiply the portion with the available bandwidth to compute the permissible bandwidth usage, wherein the portion is a percentage.

17. The apparatus of claim 15, wherein the calculation module is configured to compute the data transfer rate from a total data transmitted statistic and a total time elapsed statistic.

18. The apparatus of claim 15, wherein the calculation module is further configured to compute a time period for which the performance of at least one data transfer is paused.

19. A system comprising:
a client, comprising
a backup module, wherein
the backup module is configured to perform a network backup operation at a data transfer rate, and
the network backup operation comprises one or more data transfer operations
a network throttling module, wherein
the network throttling module is configured to control the data transfer rate of the backup operation by virtue of being configured to
identify a bandwidth range of a network connection,
select a network throttling profile from a plurality of network throttling profiles, wherein
the network throttling profile is selected based, at least in part, on the bandwidth range of the network connection,
the network throttling profile is based on information regarding the network backup operation,
the network connection is one of a plurality of network connections, and
each of the plurality of network throttling profiles is associated with at least one of the plurality of network connections,
compute a permissible bandwidth usage for the network connection using the network throttling profile, wherein the permissible bandwidth usage comprises
a portion of available bandwidth at the network connection,
the permissible bandwidth usage is allocated for performance of the one or more data transfer operations, and
the network throttling profile identifies the portion,
compare the permissible bandwidth usage and the data transfer rate to produce a comparison result, wherein
the data transfer rate is used to perform at least one of the one or more data transfer operations, and
the network backup operation comprises the at least one of the one or more data transfer operations, and
adjust the data transfer rate based on the comparison result, wherein
the data transfer rate is adjusted closer to the permissible bandwidth usage; and
a network interface, configured to couple the client to a storage subsystem, wherein
the network interface is configured to transmit data from the client to the storage subsystem during the performance of the at least one data transfer operation.

20. The system of claim 19 further comprising a calculation module configured to compute the available bandwidth based on at least one statistic associated with the network.

21. The system of claim 19, wherein the network throttling module is configured to adjust the optimal data transfer rate after a change in a load at the network.

* * * * *